United States Patent
Jakobcic et al.

[11] Patent Number: 6,116,511
[45] Date of Patent: Sep. 12, 2000

[54] METHOD OF INITIALIZING AN IN-CAR TEMPERATURE SENSOR FOR A CLIMATE CONTROL SYSTEM

[75] Inventors: Gary Edward Jakobcic, Royal Oak; Jeffrey Stephen Janus, Waterford; James Bruce Walunas, Ann Arbor; Michael Benjamin Allweiss, Oak Park; Robert Amano, Livonia, all of Mich.

[73] Assignee: Ford Motor Company, Dearborn, Mich.

[21] Appl. No.: 09/459,123

[22] Filed: Dec. 10, 1999

[51] Int. Cl.[7] .............................. B60H 1/00; G05D 23/00
[52] U.S. Cl. ..................... 236/49.3; 236/91 C; 62/133; 165/202
[58] Field of Search .................. 236/49, 3, 78 D, 236/91 C; 62/133, 323.1; 165/202

[56] References Cited

U.S. PATENT DOCUMENTS

| | | | |
|---|---|---|---|
| 4,364,513 | 12/1982 | Tsuzuki et al. | 62/186 X |
| 4,408,713 | 10/1983 | Iijima et al. | 236/49.3 |
| 4,602,675 | 7/1986 | Kobayashi | 236/49.3 |
| 4,962,302 | 10/1990 | Katsumi | 236/13 |
| 5,165,595 | 11/1992 | Horio et al. | 236/49.3 |
| 5,427,313 | 6/1995 | Davis, Jr. et al. | 236/91 C X |
| 5,669,226 | 9/1997 | Kurahashi et al. | 236/78 D |
| 5,676,204 | 10/1997 | Samukawa et al. | 165/204 |
| 5,769,316 | 6/1998 | Ikeda et al. | 62/160 |
| 5,983,649 | 11/1999 | Aislabie et al. | |

*Primary Examiner*—William Wayner
*Attorney, Agent, or Firm*—Charles H. Ellerbrock

[57] ABSTRACT

A method of initializing an in-car temperature sensor for a climate control system on a vehicle includes the steps of determining if a predetermined condition for initializing the in-car temperature sensor is satisfied and using an actual in-car temperature sensor output if the predetermined condition for initializing the in-car temperature sensor is not satisfied, and initializing the in-car temperature sensor output with an ignition-off in-car temperature sensor value if the predetermined condition for initializing the in-car temperature sensor is satisfied. The method also includes the steps of determining if a predetermined condition indicating not to use the initialized in-car temperature sensor output is satisfied and using an actual in-car temperature sensor output if the predetermined condition. The method further includes the steps of using an initialized in-car temperature sensor output to control the climate control system if the predetermined condition indicating not to use the initialized in-car temperature sensor output is not satisfied.

17 Claims, 2 Drawing Sheets

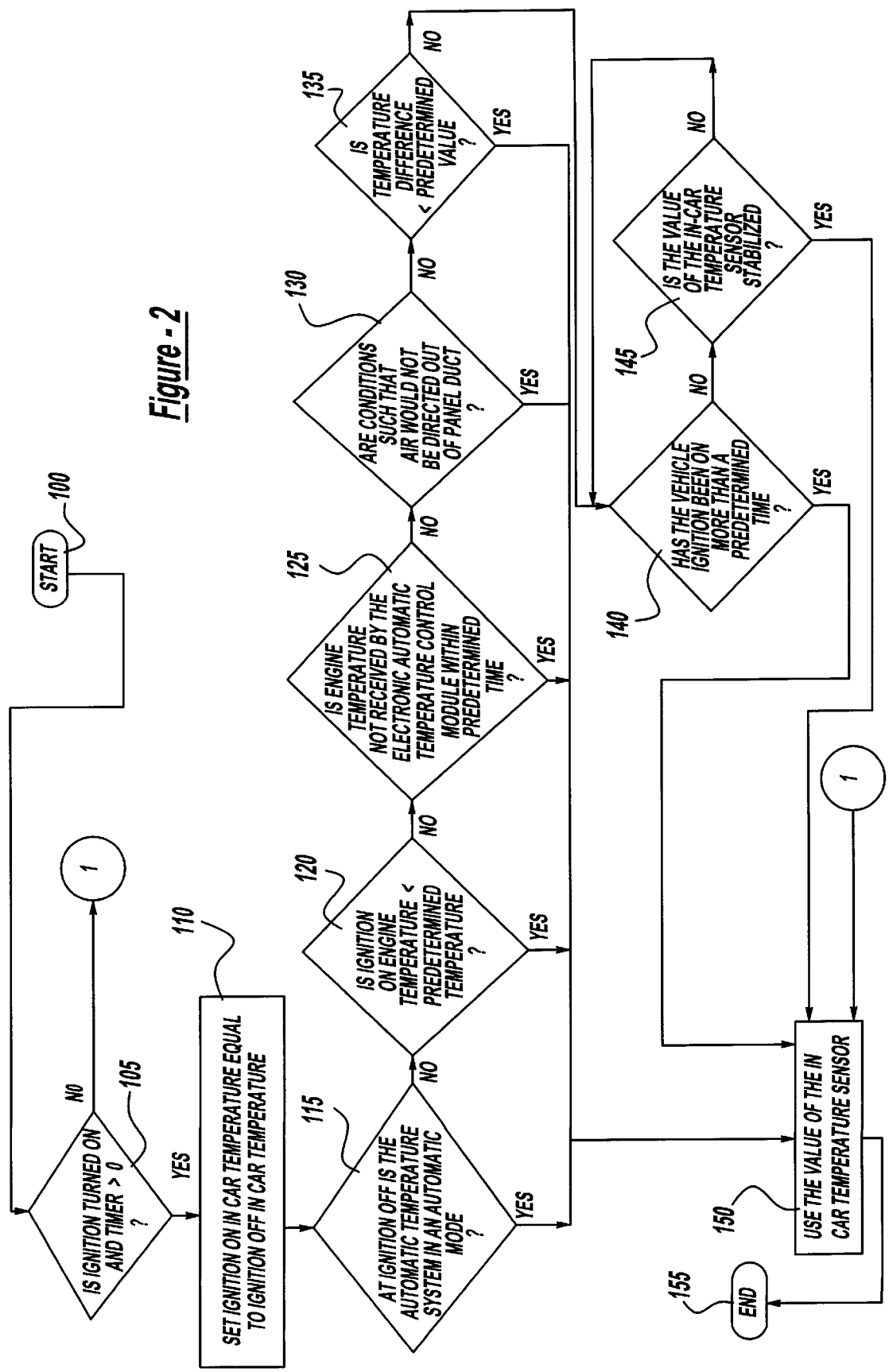

METHOD OF INITIALIZING AN IN-CAR TEMPERATURE SENSOR FOR A CLIMATE CONTROL SYSTEM

BACKGROUND OF THE INVENTION

1. Field of the Invention

The present invention relates generally to a climate control system on a vehicle and, more specifically, to a method of initializing an in-car temperature sensor for a climate control system on a vehicle.

2. Description of the Related Art

A climate control system on a vehicle, such as a motor vehicle, maintains a condition within an occupant compartment of the vehicle at a comfortable level by providing heating, cooling and ventilation. One example of a condition is air temperature, another is air distribution, while still another is air flow rate. Typically, the comfort level is subjectively determined by an occupant of the vehicle and communicated to the climate control system via a set point or other temperature control actuator, as is known in the art.

Climate control within the occupant compartment is maintained by an integrated mechanism referred to in the art as a heating, ventilation and air conditioning (HVAC) air-handling system. In an automatic climate control system, the comfort level within the occupant compartment is automatically controlled by the HVAC air-handling system. The comfort level within the occupant compartment of the vehicle is dependent on many objective and subjective factors, such as occupant preference, vehicle operating conditions, ambient temperature, humidity level, and sun heating load. The HVAC air-handling system typically includes sensing mechanisms and actuators, for sensing conditions within the occupant compartment and maintaining the desired comfort level. One example of a sensing mechanism is an in-car temperature sensor that measures the temperature within the occupant compartment. The occupant compartment temperature sensed by the in-car temperature sensor is one of several factors used by the HVAC air-handling system in maintaining the comfort level within the occupant compartment.

Under certain vehicle operating conditions, the in-car temperature sensor may be temporarily influenced by a localized pocket of heated air in the immediate vicinity of the in-car temperature sensor that is not indicative of the actual temperature within the occupant compartment. For example, if the ambient temperature is cold, the occupant compartment is warm, and the vehicle ignition is keyed off after being operational a predetermined period of time, a pocket of localized heated air from a source such as the heater core, may temporarily heat the in-car temperature sensor. If the vehicle ignition is keyed-on within a few minutes of being keyed-off, the initial output measurement of the in-car temperature sensor may indicate a warmer temperature than the actual air temperature of the occupant compartment. The HVAC air-handling system will respond by blowing cold air out of a panel duct, since it is erroneously sensing that the comfort level is too warm. This may occur for a few minutes until the in-car temperature sensor stabilizes to the actual occupant compartment air temperature and the HVAC air-handling system readjusts the temperature of the air being blown from the ducts to a warmer temperature.

One example of an automatic climate control system is disclosed in U.S. Pat. No. 5,427,313, to Davis Jr. et al., the disclosure of which is hereby incorporated by reference. While this method of automatic climate control works, it does not compensate for inadvertent heating of the in-car temperature sensor while the vehicle ignition is temporarily keyed off. Thus, there is a need in the art to provide a method of initializing an in-car temperature sensor for a climate control system that checks for inadvertent heating of the in-car temperature sensor to prevent the blowing of cold air out of the ducts.

SUMMARY OF THE INVENTION

Accordingly, the present invention is a method of initializing an in-car temperature sensor for a climate control system on a vehicle. The method includes the steps of determining if a predetermined condition for initializing the in-car temperature sensor is satisfied and using an actual in-car temperature sensor output if the predetermined condition for initializing the in-car temperature sensor is not satisfied. The method includes the steps of initializing the in-car temperature sensor output with an ignition-off in-car temperature sensor value if the predetermined condition for initializing the in-car temperature sensor is satisfied. The method also includes the steps of determining if a predetermined condition indicating not to use the initialized in-car temperature sensor output is satisfied and using an actual in-car temperature sensor output if the predetermined condition indicating not to use the initialized in-car temperature sensor output is satisfied. The method further includes the steps of using an initial in-car temperature sensor output to control the climate control system, if the predetermined condition indicating not to use the initialized in-car temperature sensor output is not satisfied.

One advantage of the present invention is that a method of initializing an in-car temperature sensor for a climate control system on a vehicle is provided that improves the comfort of the occupant. Another advantage of the present invention is that the method of initializing an in-car temperature sensor detects inadvertent heating of the in-car temperature sensor while the vehicle is keyed off. Still another advantage of the present invention is that the method of initializing an in-car temperature sensor modifies the output of the in-car temperature sensor if inadvertent heating of the in-car temperature sensor is detected.

Other features and advantages of the present invention will be readily appreciated, as the same becomes better understood after reading the subsequent description taken in conjunction with the accompanying drawings.

BRIEF DESCRIPTION OF THE DRAWINGS

FIG. 2 is a flowchart of a method of initializing an in-car temperature sensor, according to the present invention, for the climate control system of FIG. 1.

DESCRIPTION OF THE PREFERRED EMBODIMENT(S)

Figure 1:
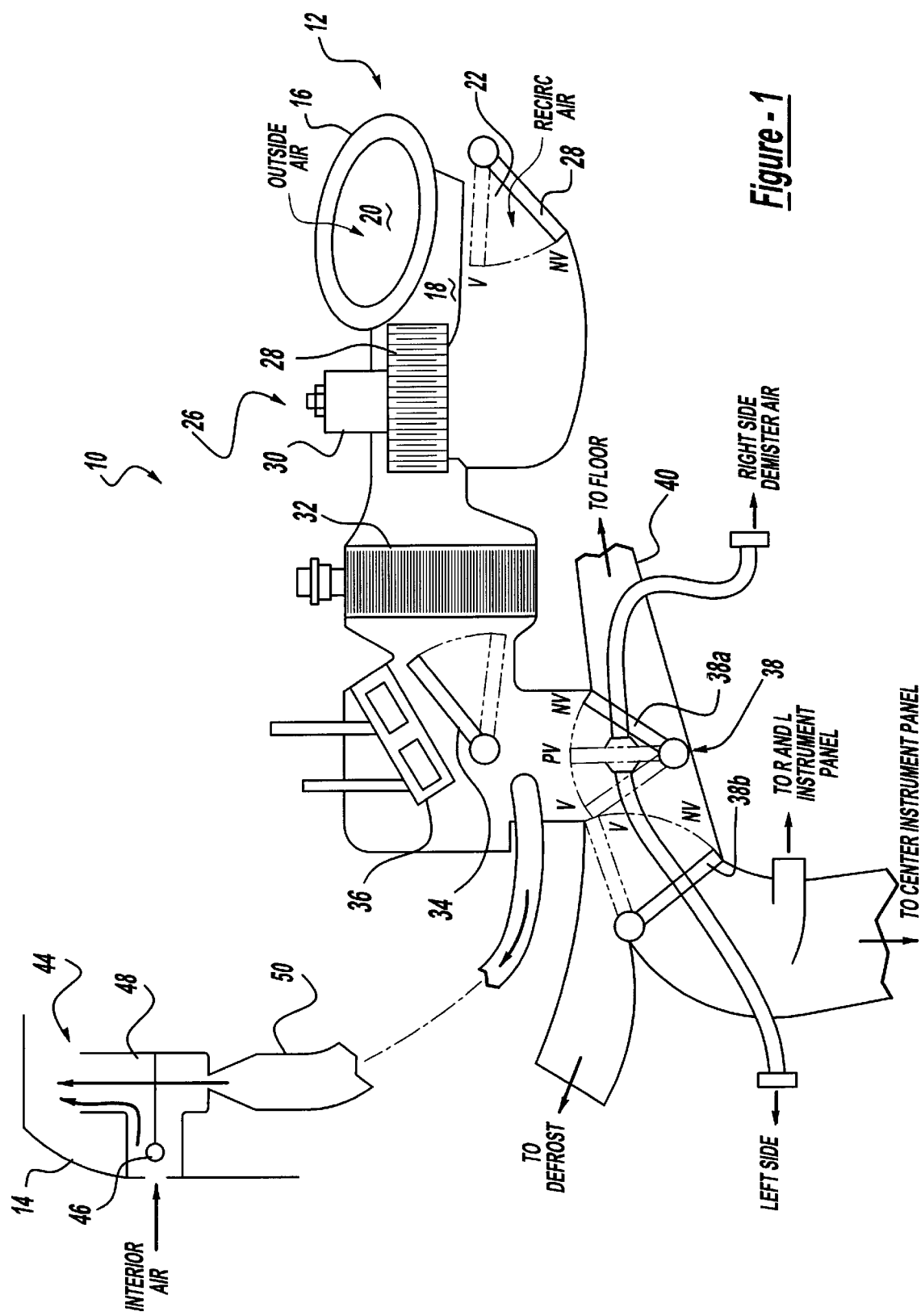
FIG. 1 is a schematic diagram of a climate control system on a vehicle, according to the present invention.

Referring to FIG. 1, one embodiment of a climate control system 10 on a vehicle (not shown) is illustrated. The climate control system 10 generally provides for heating, ventilation and air conditioning of an occupant compartment (not shown) of the vehicle. Advantageously, the climate control system 10 provides for a comfortable interior temperature of the occupant compartment, and good visibility through the windshield (not shown) and other windows (not shown) of the vehicle. It should be appreciated that the comfort level of an occupant (not shown) within the vehicle may be affected by factors such as occupant compartment temperature, ambient temperature, sunload, external air flow and heat radiation.

Preferably, the comfort level of the climate control system 10 can be controlled by the occupant. For example, an operational mode can be manually controlled by the occupant, or automatically controlled by the climate control system 10, as is known in the art. An example of an operational mode includes a defrost mode, a heating mode, or a cooling mode. Also, an air distribution mode can be manually controlled by the occupant or automatically controlled by the climate control system 10. The air distribution mode determines which ducts the air is distributed from, such as a panel mode, floor mode or mixed panel-floor mode. Further, an air temperature level can be automatically controlled by the climate control system 10 or manually controlled by a temperature control actuator. Still further, an occupant may manually control a blower speed level or the climate control system 10 may automatically control a blower speed level to control a rate at which conditioned air is forced out of a duct.

The climate control system 10 includes an air-flow handling system, referred to in the art as a heating, ventilation and air conditioning (HVAC) air handling system 12. The HVAC air handling system 12 conditions a flow of air by heating or cooling the airflow and distributing the flow of conditioned air to the interior of the occupant compartment of the vehicle. It should be appreciated that, in this example, the HVAC air handling system 12 is positioned on the occupant compartment side of a dash panel (not shown), below an instrument panel, partially shown at 14. Also, in this example, the HVAC air handling system 12 includes a case (not shown), having a preferred architecture, to package the individual component parts of the HVAC air handling system 12, to be described.

The HVAC air handling system 12 includes an air inlet duct 16. The air inlet duct 16 includes an interior chamber 18 that is hollow, for receiving air to be conditioned. The air inlet duct 16 includes an inlet opening to allow the ingress of air to be conditioned into the interior chamber 18. The air inlet duct 16 receives air from outside of the vehicle, or recirculated air from inside the occupant compartment of the vehicle.

In this example, there is an outside air inlet opening 20 for receiving outside air, such as through a vent (not shown) located near a windshield portion of the vehicle and a recirculated air inlet opening 22 for receiving recirculated air from the occupant compartment. Preferably, the opening 22 is covered by a door, shown at 24, for the recirculated air inlet opening 22, that operatively controls the ingress of air. The interior chamber 18 is actuable between multiple conditions, including one hundred percent outside air and no recirculated air, one hundred percent (100%) recirculated air and no outside air, and a mixture of outside air and recirculated air. It should be appreciated that the size of the air inlet duct 16 and position relative to the case is part of an HVAC air-handling system architecture. The air inlet duct 16 also includes an egress opening for the air to leave the interior chamber 18 of the air inlet duct 16.

The HVAC air-handling system 12 also includes a blower system 26 operatively connected to the egress opening in the air inlet duct 16. The blower system 26 pulls air through the air inlet duct 16 and forces it through the rest of the HVAC system 12, in a manner to be described. The blower system 26 includes a scroll assembly having a wheel 28 and a motor 30, as it is known in the art. Preferably, the motor 30 is part of a centrifugal blower function for the blower assembly 26.

The HVAC air-handling system 12 further includes an evaporator core 32 operably connected to the blower assembly 26, that receives the flow of air to be conditioned. Depending on the operational mode selected, the flow of air to be conditioned is either outside air, or recirculated air from the occupant compartment. It should be appreciated that, in this example, there is a filter (not shown) positioned between the blower assembly 26 and the evaporator core 32, to filter the air before it passes through the evaporator core 32. The evaporator core 32 cools and dehumidifies the air to be conditioned, by the thermodynamic transfer of heat from the air to be conditioned to a refrigerant, as is known in the art. The now conditioned air exits the evaporator core 32 and is distributed in a manner to be described.

The HVAC air-handling system 12 also includes a blend door 34 that diverts the flow of conditioned air leaving the evaporator core 32 to adjust the temperature of the air, depending on the selected operational and temperature modes. It should be appreciated that the blend door 34 may be actuated by an actuator (not shown). The actuator may be electrically operated, mechanically operated, or vacuum operated, as is known in the art. The blend door 34 directs the flow of air either into a heater core 36, to be described, or to bypass the heater core 36, or partially through the heater core 36.

The HVAC air handling system 12 includes a heater core 36 that receives a flow of air to be heated and a coolant fluid, which, in this example, is an engine coolant, as is known in the art. The heater core 36 heats the air by the thermodynamic transfer of heat from the coolant fluid.

The HVAC air handling system 12 also includes an air mix door generally indicated at 38 in communication with a duct 40. The air mix door 38 directs the flow of conditioned air from the evaporator core 32, or heater core 36, or a combination of both, into the duct 40 for distribution in the occupant compartment, depending on the selected air distribution mode. In this example, a first air mix door 38a operatively directs the flow of conditioned air out through a panel duct (not shown) in the instrument panel 14 or floor duct (not shown) and into the occupant compartment. A second air mix door 38b operatively directs the flow of conditioned air through the panel duct or a defrost duct (not shown) and into the occupant compartment.

The climate control system 10 includes a sensing mechanism, generally indicated at 44, for monitoring conditions both within and outside the occupant compartment of the vehicle. One example of a sensing mechanism 44 is an in-car temperature sensor 46, such as a thermistor. In this example, the in-car temperature sensor 46 is operatively connected to a vacuum device, such as a venturi 48. The venturi 48 is operatively connected to the HVAC air-handling system 12 by an in-car aspirator hose 50, that routes air through the venturi, as is known in the art.

The in-car temperature sensor 46 provides an input signal to a control mechanism (to be described) for automatic temperature level control of the air exiting the duct 40 into the occupant compartment. Preferably, the in-car temperature sensor 46 is operatively disposed within the instrument panel 14, such that the sensor 46 can sense the air temperature condition within the occupant compartment. In operation, the venturi 48 creates a vacuum, which draws a flow of air, representative of the air in the occupant compartment, across the in-car temperature sensor 46. The in-car temperature sensor 46 senses the temperature of the air flow, and sends an output signal to the control mechanism representative of the air temperature.

The climate control system 10 also includes a control mechanism, such as an electronic controller (not shown), that operatively controls the HVAC-air handling system 12. In the example, the controller receives an input from the in-car temperature sensor 46, an ambient air temperature sensor (not shown), an engine coolant temperature sensor (not shown), and a sun load sensor (not shown). The controller also receives an input from an occupant as known in the art, indicating a desired comfort level. The controller processes the inputs and provides an output signal to the HVAC air-handling system 12 to operatively control the temperature of the conditioned air, distribution of air, and air flow rate to the occupant compartment, at the desired comfort level.

Preferably, the climate control system 10 includes other component parts, such as sensors (not shown), valves (not shown) and switches (not shown), which are conventional and known in the art to operatively transfer, condition and distribute the air flow.

Referring to FIG. 2, a method of initializing the in-car temperature sensor 46 for the climate control system 10 is illustrated. Advantageously, the methodology determines if inadvertent heating of the in-car temperature sensor 46 has occurred, and initializes the output of the in-car temperature sensor 46. It should be appreciated that inadvertent heating of the in-car temperature sensor 46 may occur if there is a cold ambient temperature, a warm occupant compartment temperature, and the vehicle is shut down for a few minutes. Heated air, such as from the heater core 36, may rise up through the in-car aspirator hose 50 and venturi 48, and warm the in-car temperature sensor 46. When the vehicle is restarted, the warmed in-car temperature sensor 46 sends an output signal to the controller indicating that the occupant compartment is warm. The controller sends another signal to the HVAC air-handling system 12 to distribute cool air through the panel ducts. This situation can result in occupant dissatisfaction, until the in-car temperature sensor 46 stabilizes and warm air is produced by the HVAC air-handling system 12.

The methodology begins in bubble 100 and advances to diamond 105. In diamond 105, the methodology determines if a predetermined condition for initializing the in-car temperature sensor 46 is satisfied. An example of a predetermined condition for initializing the in-car temperature sensor 46 is if the vehicle ignition has changed from a key-off position to a key-on position and if a timer is initialized with a predetermined value, such as a value greater than zero (0). It should be appreciated that the timer is representative of a maximum amount of time for the methodology to occur.

If the predetermined condition for initializing the in-car temperature sensor 46 is not satisfied, such as the ignition has not changed from a key-off position to a key-on position, and the timer is not greater than a predetermined value, the methodology advances to block 150, to be described. If the predetermined condition for initializing the in-car temperature sensor 46 is met, such as the ignition has changed from a key-off position to a key-on position, and the timer is greater than the predetermined value, the methodology advances to block 110.

In block 110, the methodology initializes the ignition key-on in-car temperature sensor output equal to an ignition key-off in-car temperature sensor output. It should be appreciated that the ignition key-off in-car temperature output is representative of the temperature of the occupant compartment at the time the ignition was keyed-off. The methodology advances to diamond 115.

In diamond 115, the methodology determines if a predetermined condition indicating not to use the initialized in-car temperature sensor output is satisfied. An example of a predetermined condition indicating not to use the initialized in-car temperature sensor output is if the climate control system 10 was in a predetermined air distribution mode when the ignition was keyed off, such as automatic panel mode, or an automatic panel-floor mode. In an automatic panel model, air is directed out of the panel ducts only. In an automatic panel-floor mode, air is directed out of both the panel and floor ducts. It should be appreciated that if the climate control system 10 was in either the automatic panel or automatic panel-floor mode, then the climate control system 10 was probably in a cooling mode, and not a heating mode. Therefore, the in-car temperature sensor 46 is not inadvertently heated. If the predetermined condition indicating not to use the initialized in-car temperature sensor output is satisfied, the methodology advances to block 150. If the predetermined condition indicating not to use the initialized in-car temperature sensor output is not satisfied, the methodology advances to diamond 120.

In diamond 120, the methodology determines if another predetermined condition indicating not to use the initialized in-car temperature sensor output is satisfied, by checking if an ignition key-on engine temperature is less than or equal to a predetermined temperature. An example of a predetermined temperature is one hundred twenty degrees (120°). If the ignition key-on engine temperature is less than or equal to the predetermined temperature, the engine is not warm, and the in-car temperature sensor 46 is not inadvertently heated. If another predetermined condition indicating not to use the initialized in-car temperature sensor output is satisfied, the methodology advances to block 150. If another predetermined condition indicating not to use the initialized in-car temperature sensor output is not satisfied, the methodology advances to diamond 125.

In diamond 125, the methodology determines if still another predetermined condition indicating not to use the initialized in-car temperature sensor output is satisfied, by checking if the engine temperature was not received by the climate control system 10 within a predetermined period of time of the ignition being keyed-on. If the engine temperature is not received within the predetermined period of time, the controller is uncertain of the engine temperature when the ignition is keyed-on. If still another predetermined condition indicating not to use the initialized in-car temperature sensor output is satisfied, the methodology advances to block 150. If the predetermined condition indicating not to use the initialized in-car temperature sensor output is not satisfied, the methodology advances to diamond 130.

In diamond 130, the methodology determines if yet still another predetermined condition indicating not to use the initialized in-car temperature sensor output is satisfied. For example, whether the use of the actual in-car temperature sensor output would result in the climate control system 10 distributing air out of a duct other than the panel duct. If yet still another predetermined condition indicating not to use the initialized in-car temperature sensor output is satisfied, the in-car temperature sensor 46 is not inadvertently heated, and the methodology advances to block 150. If yet still another predetermined condition indicating not to use the initialized in-car temperature sensor output is not satisfied, the methodology advances to diamond 135.

In diamond 135, the methodology determines if a further predetermined condition indicating not to use the initialized in-car temperature sensor output is satisfied, such as by checking if a difference between the ignition key-on in-car temperature sensor output and ignition key-off in-car temperature sensor output is less than a predetermined constant value, such as a positive five degrees (+5°). If the further predetermined condition indicating not to use the initialized in-car temperature sensor output is satisfied, because the difference is less than the predetermined constant value, the methodology advances to block 150. If the further predetermined condition indicating not to use the initialized in-car temperature sensor output is not satisfied, because the difference is greater than the predetermined constant value, the methodology advances to diamond 140.

In diamond 140, the methodology determines if a predetermined condition for resuming to use the actual in-car sensor temperature output by the controller in controlling the climate control system 10 is satisfied. For example, whether a timer measuring how long the ignition has been keyed-on is greater than a predetermined time, such as forty seconds (40). If a predetermined condition for resuming to use the actual in-car sensor temperature output is satisfied, such as if the timer is greater than the predetermined time, the methodology advances to block 150. If a predetermined condition for resuming to use the actual in-car sensor temperature output is not satisfied, such as if the timer is not greater than the predetermined time, the methodology advances to diamond 145.

In diamond 145, the methodology determines if another predetermined condition for resuming to use the actual in-car sensor temperature output by the controller in controlling the climate control system 10 is satisfied, such as if the output of the in-car temperature sensor 46 is stabilized. If another predetermined condition for resuming to use the actual in-car sensor temperature output is not satisfied, such as if the in-car temperature sensor output is not stabilized, the methodology returns to diamond 140 previously described.

If another predetermined condition for resuming to use the actual in-car sensor temperature output is satisfied, such as if the in-car temperature sensor output is stabilized, the methodology advances to block 150.

In block 150, the methodology uses the actual in-car temperature sensor output in controlling the temperature and distribution of conditioned air from the HVAC air-handling system 12 into the occupant compartment. The methodology advances to bubble 155 and ends.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of initializing an in-car temperature sensor for a climate control system on a vehicle, said method comprising the steps of:

determining if a predetermined condition for initializing the in-car temperature sensor is satisfied and using an actual in-car temperature sensor output if the predetermined condition for initializing the in-car temperature sensor is not satisfied;

initializing the in-car temperature sensor output with an ignition-off in-car temperature sensor value if the predetermined condition for initializing the in-car temperature sensor is satisfied;

determining if a predetermined condition indicating not to use the initialized in-car temperature sensor output is satisfied and using an actual in-car temperature sensor output if the predetermined condition indicating not to use the initialized in-car temperature sensor output is satisfied; and using an initialized in-car temperature sensor output to control the climate control system until the in-car temperature sensor is stabilized, if the predetermined condition indicating not to use the initialized in-car temperature sensor output is not satisfied.

2. A method as set forth in claim 1 wherein said step of determining if the predetermined condition for initializing the in-car temperature sensor is satisfied comprises determining if a vehicle ignition changed from a key-off position to a key-on position.

3. A method as set forth in claim 1 wherein said step of determining if the predetermined condition indicating not to use the initialized in-car temperature sensor output is satisfied comprises determining if the climate control system is in a predetermined mode.

4. A method as set forth in claim 3 wherein the predetermined mode is a panel mode.

5. A method as set forth in claim 1 wherein said step of determining if the predetermined condition indicating not to use the initialized in-car temperature sensor output is satisfied comprises determining if an engine temperature is less than a predetermined temperature.

6. A method as set forth in claim 1 wherein said step of determining if the predetermined condition indicating not to use the initialized in-car temperature sensor output is satisfied comprises determining if an engine temperature output signal is not received by the climate control system within a predetermined period of time.

7. A method as set forth in claim 1 wherein said step of determining if the predetermined condition indicating not to use the initialized in-car temperature sensor output is satisfied comprises determining if using the actual in-car temperature sensor value would result in not distributing air from a panel duct.

8. A method as set forth in claim 1 wherein said step of determining if the predetermined condition indicating not to use the initialized in-car temperature sensor output is satisfied comprises determining if a difference between the ignition key-on in-car temperature and the ignition key-off in-car temperature is less than a predetermined constant value.

9. A method as set forth in claim 1 wherein said step of determining if the predetermined condition for resuming to use the actual in-car temperature sensor output is satisfied comprises determining if a timer is greater than a predetermined time.

10. A method as set forth in claim 1 wherein said step of determining if the predetermined condition for resuming to use the actual in-car temperature sensor output is satisfied comprises determining if the output of the in-car temperature sensor is stabilized.

11. A method of initializing an in-car temperature sensor for a climate control system on a vehicle, said method comprising the steps of:

determining if a vehicle ignition has changed from a key-off position to a key-on position and using an actual in-car temperature sensor output if the ignition position has not changed;

initializing the in-car temperature sensor output with an ignition-off in-car temperature sensor value if the ignition position has changed;

determining if a predetermined condition indicating not to use the initialized in-car temperature sensor output is satisfied and using an actual in-car temperature sensor output to control the climate control system if the predetermined condition indicating not to use the initialized in-car temperature sensor output is satisfied;

determining if a predetermined condition for resuming to use the actual in-car temperature sensor is satisfied, if the predetermined condition indicating not to use the initialized in-car temperature sensor output is not satisfied; and using an initialized in-car temperature sensor output to control the climate control system until the in-car temperature sensor output is stabilized, if the predetermined condition for resuming to use the actual in-car temperature sensor output is not satisfied.

12. A method as set forth in claim 11 wherein said step of determining if the predetermined condition indicating not to use the initialized in-car temperature sensor output is satisfied comprises determining if the climate control system is in a predetermined mode.

13. A method as set forth in claim 12 wherein said predetermined mode is a panel mode.

14. A method as set forth in claim 11 wherein said step of determining if the predetermined condition indicating not to use the initialized in-car temperature sensor output is satisfied comprises determining if an engine temperature is less than a predetermined temperature.

15. A method as set forth in claim 11 wherein said step of determining if the predetermined condition indicating not to use the initialized in-car temperature sensor output is satisfied comprises determining if an engine temperature output signal is not received by the climate control system within a predetermined period of time.

16. A method as set forth in claim 11 wherein said step of determining if the predetermined condition indicating not to use the initialized in-car temperature sensor output is satisfied comprises determining if using the actual in-car temperature sensor value would result in not distributing air from a panel duct.

17. A method as set forth in claim 11 wherein said step of determining if the predetermined condition indicating not to use the initialized in-car temperature sensor output is satisfied comprises determining if a difference between the ignition key-on in-car temperature and the ignition key-off in-car temperature is less than a predetermined constant value.

* * * * *